US009498768B2

United States Patent
Pourkhalil et al.

(10) Patent No.: US 9,498,768 B2
(45) Date of Patent: Nov. 22, 2016

(54) NANO-HYBRID CATALYST FOR $NO_x$ REMOVAL

(71) Applicants: Research Institute of Petroleum Industry (RIPI), Tehran (IR); Tarbiat Modaress University, Tehran (IR)

(72) Inventors: Mahnaz Pourkhalil, Tehran (IR); Alimorad Rashidi, Tehran (IR); Abdolsammad Zarringhalam Moghaddam, Tehran (IR); Mahdi Mohajeri, Tehran (IR); Ali Mehri, Tehran (IR)

(73) Assignees: Research Institute of Petroleum Industry, Tehran (IR); Tarbiat Modaress University, Tehran (IR)

( * ) Notice: Subject to any disclaimer, the term of this patent is extended or adjusted under 35 U.S.C. 154(b) by 0 days.

(21) Appl. No.: 14/489,594

(22) Filed: Sep. 18, 2014

(65) Prior Publication Data

US 2015/0144037 A1    May 28, 2015

Related U.S. Application Data

(60) Provisional application No. 61/880,986, filed on Sep. 23, 2013.

(51) Int. Cl.
*B01J 23/80*    (2006.01)
*B01J 23/84*    (2006.01)
(Continued)

(52) U.S. Cl.
CPC .......... *B01J 23/755* (2013.01); *B01D 53/8628* (2013.01); *B01J 21/185* (2013.01);
(Continued)

(58) Field of Classification Search
CPC ........ B01J 23/745; B01J 23/80; B01J 23/84; B01J 23/8892; B01J 21/185
USPC .............. 502/329, 337, 338, 524; 423/213.5, 423/239.1, 447.1; 422/177; 977/742, 750, 977/752
See application file for complete search history.

(56) References Cited

U.S. PATENT DOCUMENTS 3,230,034 A * 1/1966 Stiles ................... B01D 53/944
                                                        423/213.2
4,916,105 A * 4/1990 Rieck ................... B01D 53/945
                                                        502/302
(Continued)

OTHER PUBLICATIONS

"Preparation of highly active manganese oxides supported on functionalized MWNTs for low temperature NOx reduction with NH3," Mahnaz Pourkhalik et al. Applied Surface Science 279 (2013), pp. 250-259.*

*Primary Examiner* — Patricia L Hailey
(74) *Attorney, Agent, or Firm* — Raymond Van Dyke; Van Dyke Law

(57) ABSTRACT

The present invention is related to the synthesis of a nano-hybrid catalyst made of carbon nanotubes and metal ferrite materials for the removal of $NO_x$ compounds, which are emitted from stationary sources, through an ammonia selective catalytic reduction process. Weight ratios of carbon nanotube (x) to metal ferrite (y) is preferably about (x/y) 0.1 to 10. The present invention is also directed to the synthesis of a nano-hybrid catalyst to improve the efficiency of the conventional $NO_x$ reduction process at lower reaction temperatures. By use of the preferred nano-hybrid catalyst, it is possible to locate a selective catalytic reduction (SCR) unit capable of operating at lower temperatures, e.g., below 260° C., and from about 50° C. to about 250° C., after the desulfurizer and the particle removal equipment. With the exhaust gas cleaner, the lifetime of the catalyst can be increased. This nano-hybrid catalyst provides higher $NO_x$ removal efficiencies at low temperatures, typically from about 50° C. to about 250° C.

14 Claims, 5 Drawing Sheets

(51) Int. Cl.
*B01J 23/755* (2006.01)
*B01J 21/18* (2006.01)
*B01D 53/86* (2006.01)
*F23J 15/02* (2006.01)
*B01J 37/03* (2006.01)
*B01J 37/08* (2006.01)
*B01J 23/74* (2006.01)
*B01J 35/00* (2006.01)

(52) U.S. Cl.
CPC ............ *B01J 23/74* (2013.01); *B01J 37/035* (2013.01); *B01J 37/036* (2013.01); *B01J 37/086* (2013.01); *F23J 15/02* (2013.01); *B01D 2255/20753* (2013.01); *B01D 2255/702* (2013.01); *B01D 2255/9202* (2013.01); *B01J 35/002* (2013.01); *F23J 2215/10* (2013.01); *F23J 2219/10* (2013.01)

(56) References Cited

U.S. PATENT DOCUMENTS

| | | | | |
|---|---|---|---|---|
| 6,514,905 | B1* | 2/2003 | Hanaki | B01D 53/945 502/327 |
| 6,887,444 | B1* | 5/2005 | Yamamoto | B01D 53/9418 423/239.2 |
| 8,784,937 | B2* | 7/2014 | Malet | B82Y 30/00 427/249.1 |
| 2005/0135982 | A1* | 6/2005 | Pavlovsky | B01D 53/8628 423/239.1 |
| 2006/0104889 | A1* | 5/2006 | Harutyunyan | B82Y 30/00 423/447.3 |
| 2006/0104890 | A1* | 5/2006 | Harutyunyan | B82Y 30/00 423/447.3 |
| 2015/0359886 | A1* | 12/2015 | Wu | A61K 9/06 604/500 |

* cited by examiner

NANO-HYBRID CATALYST FOR $NO_x$ REMOVAL

CROSS REFERENCE TO RELATED APPLICATION

The present invention claims priority from U.S. Provisional Patent Application Ser. No. 61/880,986, filed Sep. 23, 2013, entitled "Nano-Hybrid Catalyst for $NO_x$ Removal," the subject matter of which is incorporated by reference herein in its entirety.

SPONSORSHIP STATEMENT

This application has been sponsored by the Iranian Nanotechnology Initiative Council, which does not have any rights in this application.

TECHNICAL FIELD

This invention generally relates to the synthesis of a nano-hybrid catalyst for selective catalytic reduction of nitrogen oxides ($NO_x$) emitted from stationary systems operating in, for example, gas- and/or fossil-fuel-fired power plants, shaft furnaces and waste incinerators at low reaction temperatures with a high efficiency and lifetime.

BACKGROUND OF THE INVENTION

Nitrogen oxides are formed when fossil fuels, such as oil, gas and coal, are burned at high temperatures in combustion engines of power plants, furnaces, off-road equipment, etc.

As is all too well understood in the art, nitrogen oxides so formed can cause acid rain, ozone depletion, photochemical smog and catastrophic greenhouse effects. Furthermore, these chemicals can be harmful to the growth of living creatures, such as special plant varieties. It is also known that small levels of $NO_x$ can cause nausea, irritated eyes and nose, fluid forming in the lungs and shortness of breath in mammals, including humans. Furthermore, reduced oxygen intake, swelling of the throat, a large buildup of fluids in the lungs, and even death can be caused by breathing in an atmosphere containing high levels of $NO_x$. The curtailment of these substances generally in the atmosphere and particularly in work places is, therefore, of paramount interest.

The United States Environmental Protection Agency (EPA) has set forth stringent standards for $NO_x$ pollution on any type of $NO_x$ emission sources, such as motor vehicles and power plants.

The selective catalytic reduction of the nitrogen oxides by ammonia is known as the best process for the reduction of $NO_x$ in off-road equipment and stationary sources.

There is, therefore, a present need for improved catalytic reduction processes for the removal of $NO_x$ molecules, such as in the reduction of the requisite operating temperatures for an $NO_x$ reduction process.

There is also a present need to increase the $NO_x$ removal efficiency in selective catalyst reduction technologies.

The prior art includes various techniques with limited conversion efficiencies, i.e., well below 100%, and usually at high temperatures, e.g., 450° C., making these techniques of limited applicability to actually reduce noxious nitrogen oxide emissions. Copper and iron are sometimes used as a catalyst for $NO_x$ abatement, where a copper catalyst shows at about 90% conversion in a temperature range of about 250° C. to 450° C. Also, an Iron catalyst provided a similar conversion value at temperatures from 355° C. to 625° C.

One disadvantage in the use of these catalysts, however, relates to the over-oxidation of ammonia to nitrous oxide at temperatures above 670° C., which reduces the efficiency of the reduction and the practical usefulness of these prior art techniques.

It is, therefore, an object of the present invention to lower the operating temperature for the reduction to more manageable levels.

It is also an object of the present invention to increase the efficiency of the reduction to greater than or equal to 99% and nearly or at 100%.

Furthermore, it is an object of the present invention to increase the life of the catalysts, further increasing the efficiency of the process.

These objects are met in one embodiment of the present invention where there is a significant reduction in the operating temperature, which enables a 100% (complete) conversion at a temperature less than 80° C. As a result of this advancement in the technology, a selective catalytic reduction (SCR) unit may now be located far from the combustion chamber, where the gaseous byproducts have cooled. Moreover, such a lowered conversion/reduction reaction temperature avoids over-oxidation of ammonia and, hence, increases the catalyst lifetime, offering significant advantages over the known prior art.

Even in prior art techniques where the efficiency of the aforementioned catalyst is near 100%, Applicant has found that this achievement comes at significant cost, e.g., requiring a pre-oxidation unit to convert NO to $NO_2$ prior to the SCR unit.

It is, accordingly, an object of the present invention to provide an improved nano-hybrid catalyst, enabling at or about 100% efficiency at low temperatures, without requiring a pre-oxidation unit.

It is a further object of the present invention that the technique of the claimed invention be a simple and straightforward preparation procedure, as well as providing high efficiencies, for the conversion of nitrogen oxides at low temperatures from about 50° C. to 200° C. by the use of a nano-hybrid catalyst made of carbon nanotubes and metal ferrite.

It is, therefore, an object of the present invention to provide improved catalysts for $NO_x$ reduction.

SUMMARY OF THE INVENTION

The present invention relates to the synthesis of a nano-hybrid catalyst for selective catalytic reduction (SCR) of $NO_x$ from stationary sources. The nano-hybrid catalyst is preferably made of carbon nanotubes, as a support, and metal ferrite compounds, as active sites. The nano-hybrid catalyst is preferably synthesized using a simple method at low temperatures (less than about 260° C.) over the carbon nanotubes. The formation of metal ferrites as active sites at low temperatures, as low as less than about 260° C., avoids their agglomeration over the carbon nanotubes. The carbon nanotubes provide a heterogonous surface, enabling the formation of the metal ferrites structures thereon at the aforementioned low temperature range by lowering the auto-combustion reaction energy. A high dispersion of metal ferrites in the form of nanoparticles over the surface of the support then contributes to the higher efficiency of $NO_x$ removal. An embodiment of this present invention relates to the decreasing of the reaction temperature for selective catalytic reduction of NON. The efficiency of the selective catalytic reduction process for $NO_x$ by the use of the disclosed nano-hybrid catalyst is higher that of by other conventional low temperature-SCR catalysts.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

DETAILED DESCRIPTION OF THE INVENTION

Figure 1:
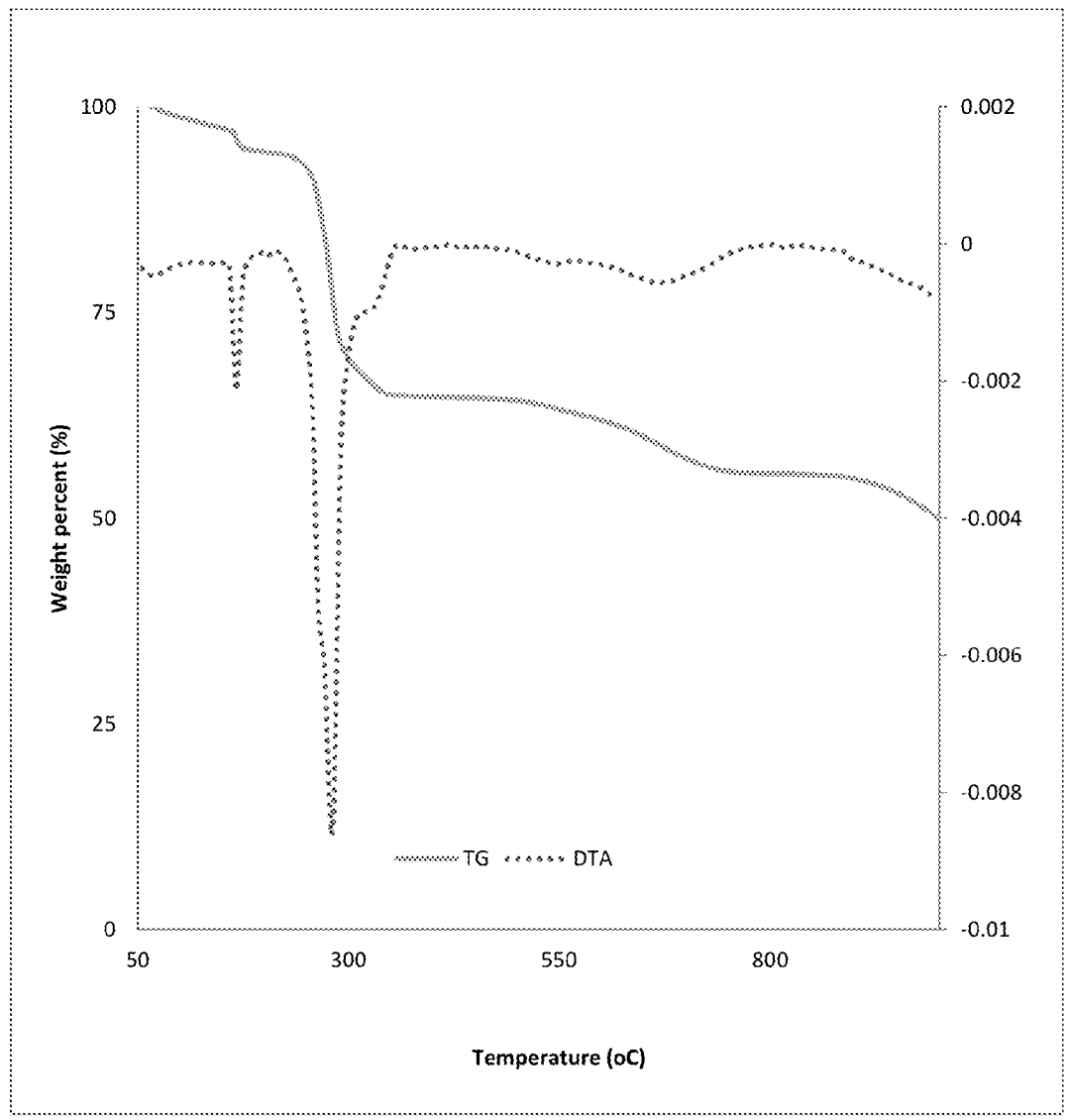
FIG. 1 is a chart representing the thermal decomposition of a nitrate-citrate gel made by the process of the present invention, illustrating a differential temperature analysis (DTA) and thermo-gravimetry analysis (TGA) for the nickel ferrite in the gel before calcination in an oxygen atmosphere, by weight and temperature.

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

It should be understood to one of skill in the art that the innovation described herein is directed to the synthesis of a nano-hybrid catalyst for selective catalytic reduction (SCR) of $NO_x$ from stationary sources, such as gas power plants, fossil fuel power plants, shaft and other furnaces, waste incinerators, and other facilities that generate $NO_x$ emissions requiring reduction to a cleaner form, such as nitrogen and oxygen gases.

The selective catalytic reduction process for $NO_x$ removal of the present invention is preferably carried out by use of one or more of several reducing agents, such as propane, methane, propylene, hydrogen, urea, ammonia, etc. For example, the various exemplary catalysts of the instant invention described in more detail hereinbelow employ ammonia as the reducing agent due to its favorable efficiency, as ascertained in industrial-scale applications.

The metal ferrite catalyst is synthesized over carbon nanotubes so as to provide effective surfaces for the metal ferrite crystallization, as well as decreasing the synthesis temperature, as discussed.

The dangerous $NO_x$ compounds emitted in an industrial or other process, such as within a furnace combustion chamber, are reduced by passing over a nano-hybrid catalyst of the present invention, which is made of carbon nanotubes and metal ferrites, to safer and usable byproducts: nitrogen gas and oxygen gas. Additionally, the nano-hybrid catalyst of carbon nanotubes and metal ferrites of the present invention provides efficient surfaces for the reaction between $NH_3$ and nitrogen oxides over the catalyst.

The aforementioned metal ferrites of the present invention are preferably prepared through various methods, such as the sol-gel method. In the present invention, the auto-combustion temperature of metal ferrites was reduced by virtue of employing the aforesaid carbon nanotubes as a substrate for the synthesis. The reduced synthesis temperature was found to hinder the agglomeration of the nanoparticles, enabling a more even spread across the surfaces of the carbon nanotubes, providing effective surfaces for the synthesis of the metal ferrite nanoparticles.

The metal in the metal ferrites is preferably selected from the group nickel, zinc, cobalt, manganese, and like metals, as are understood in the art. It should be understood that although the above elements are preferred, other metallic ferrites may be employed in practicing the principles of the present invention, including the various other transition metals as set forth in the periodic table of the elements, such as the metals in period 4, atomic numbers 21-30, and corresponding metallic elements in periods 5-7, as applicable and available for use in the instant invention.

The aforementioned reduction in the reaction temperature for the catalytic reduction process, a significant industrial production advantage, enables the application of the catalyst within a reactor far away from the combustion engine (such as where the exhaust gas is less than about 200° C.), which in turn lowers the chances for catalyst carbonization on the surface of the nano-hybrid catalyst due to heat damage, and consequently, increases the catalyst lifetime.

Exemplary techniques for the production of the catalysts pursuant to the present invention are set forth hereinbelow. It should be understood that these techniques are illustrative only, and similar techniques for the production of the preferred catalysts of the present invention are thus possible with different parameters, as is understood in the art. The examples should not be deemed as limiting the scope of the present invention. The only limitations of the scope of the instant case are set forth in the claims appended hereinbelow.

Example 1

In this example, one mole of nickel nitrate ($Ni(NO_3)_3 \cdot 6H_2O$), 2 moles of ferric nitrate ($Fe(NO_3)_3 \cdot 9H_2O$), an amount of citric acid ($C_6H_8O_7 \cdot H_2O$) weighing 2 times the weight of said nickel nitrate, and cetyltrimethylammonium bromide (CTAB) in an amount about 0.4 times the weight of said nickel nitrate were dissolved in de-ionized water under vigorous stirring, while the temperature was maintained constantly at 80° C. An aqueous caustic was added to the mixture to adjust the pH value to about 7. Subsequently, the temperature was raised to 100° C. until a viscous gel of a nitrate-citrate complex formed. The sample was then calcinated at approximately 280° C. (in a five volume % oxygen in helium atmosphere). A number of auto-combustion reactions then occurred and resulted in a fluffy powder due to the liberation of an enormous amount of gasses during a short period of time.

Thermal decomposition of the gel was then studied by a differential temperature analysis/thermo-gravimetry analysis (DTA/TGA). As illustrated, FIG. 1 of the DRAWINGS shows the aforementioned DTA/TGA results for the Ni—Fe hybrid catalyst before the calcinations.

Figure 2:
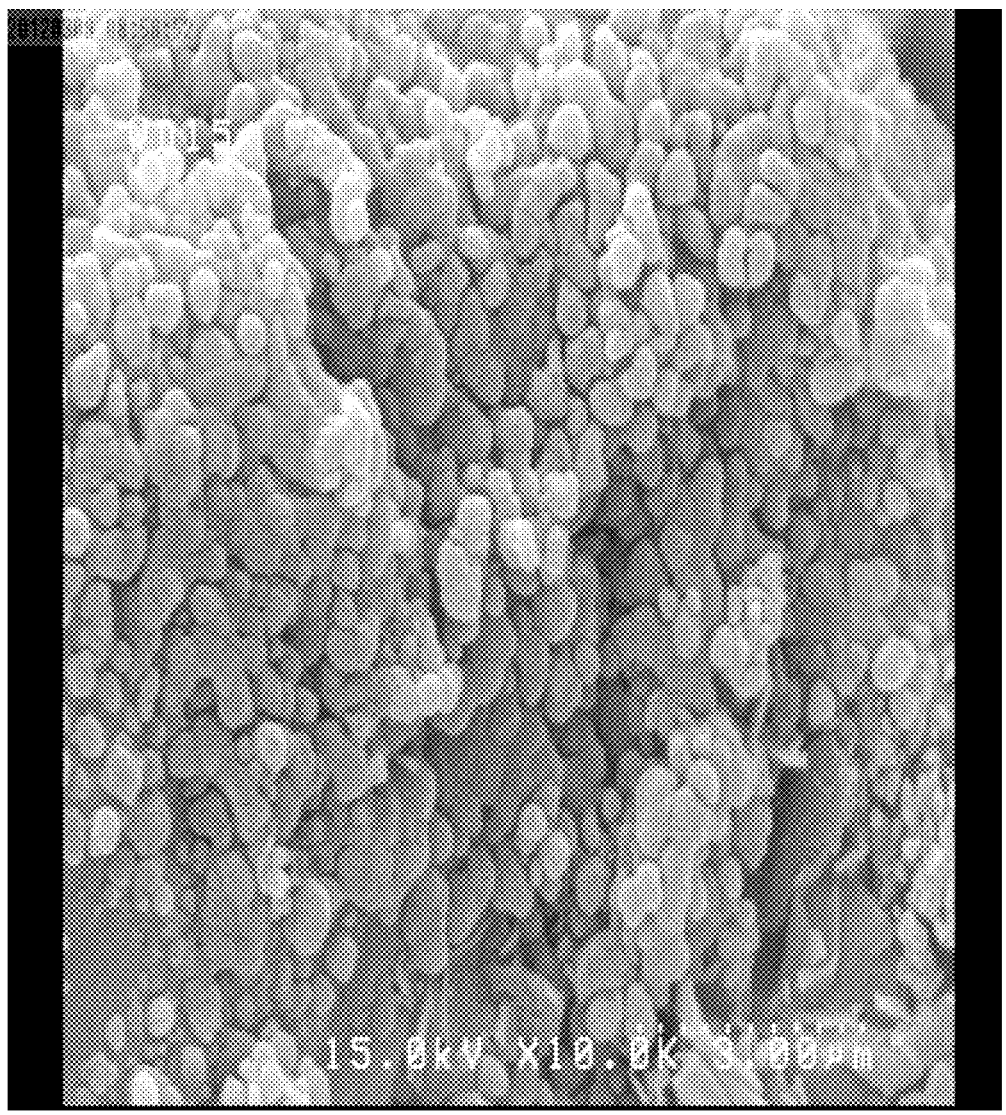
FIG. 2 is a field emission scanning electron microscope (FESEM) image of the nickel ferrite hybrid structure synthesized at 280° C.

With reference now to FIG. 2 of the DRAWINGS, this image illustrates the results of a field emission scanning electron microscope (FESEM) view of the aforesaid Ni—Fe hybrid catalyst calcinated at 280° C.

Example 2

In this second example, one mole of nickel nitrate (Ni $(NO_3)_3 \cdot 6H_2O$), 2 moles of ferric nitrate (Fe$(NO_3)_3 \cdot 9H_2O$), an amount of citric acid ($C_6H_8O_7 \cdot H_2O$) weighing 2 times the weight of said nickel nitrate, and cetyltrimethylammonium bromide (CTAB) in an amount about 0.4 times the weight of said nickel nitrate were dissolved in de-ionized water under vigorous stirring, while the temperature was kept constant at 80° C. Carbon nanotubes were dispersed in the nickel ferrite solution with 10, 20 and 70% of the loaded nickel ferrite. An aqueous caustic was then added to the system to adjust the pH value to about 7. Subsequently, the temperature was elevated to 100° C. until a viscous gel of the nitrate-citrate complex was formed. The sample was calcinated at a 5 volume % oxygen in helium atmosphere at different temperatures. The various calcination temperatures are listed hereinbelow in TABLE 1.

Figure 3:
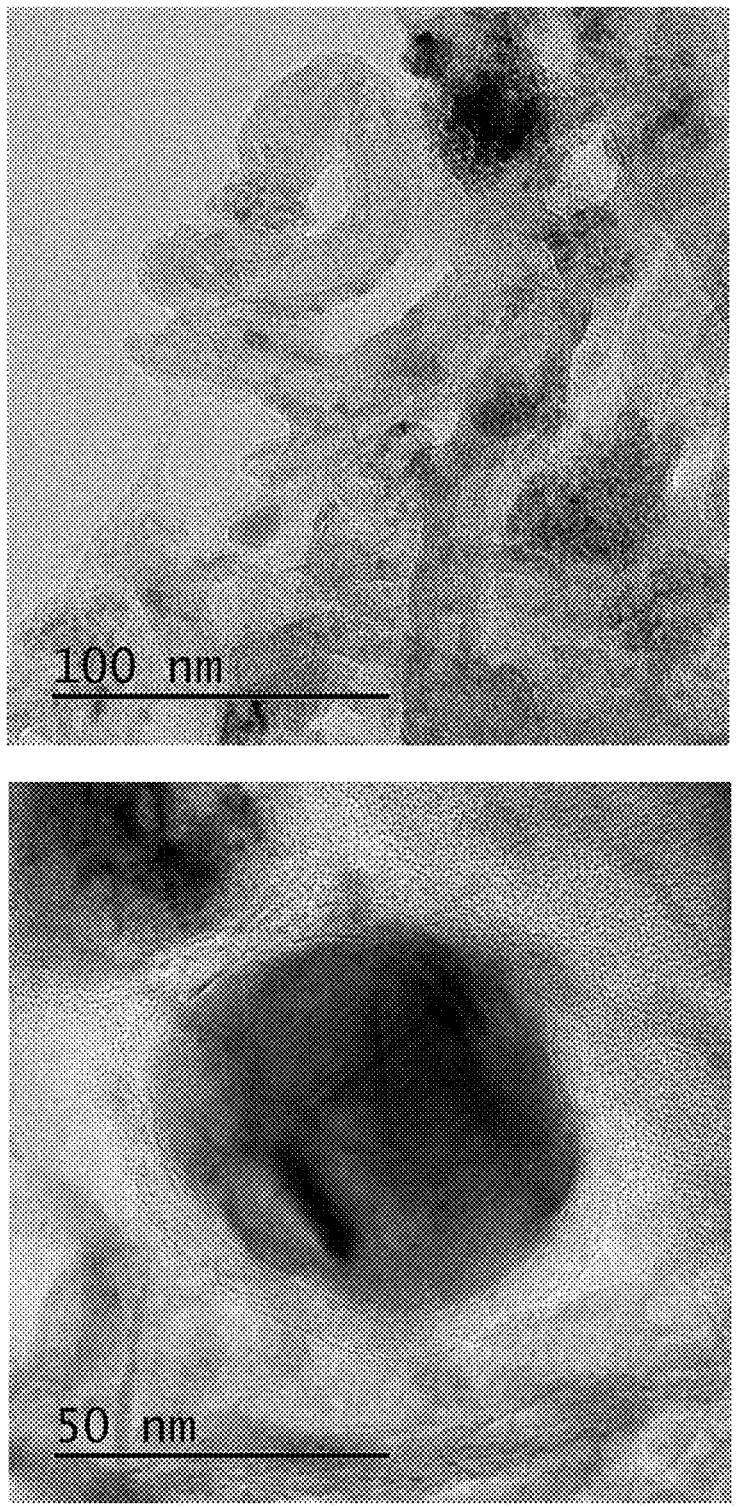
FIG. 3 are high resolution transmission electron microscope (HRTEM) images of a nano-hybrid catalyst of carbon nanotubes and nickel ferrite (70 wt % Ni—Fe) calcinated at 220° C., at 100 nm and 50 nm, respectively.

With reference now to FIG. 3 of the DRAWINGS, there are shown high resolution transmission electron microscope (HRTEM) images of the nano-hybrid catalyst of carbon nanotubes and nickel ferrite (at 70 wt % Ni—Fe) calcinated at 220° C., with image resolution at 100 nm and 50 nm, respectively.

Figure 4:
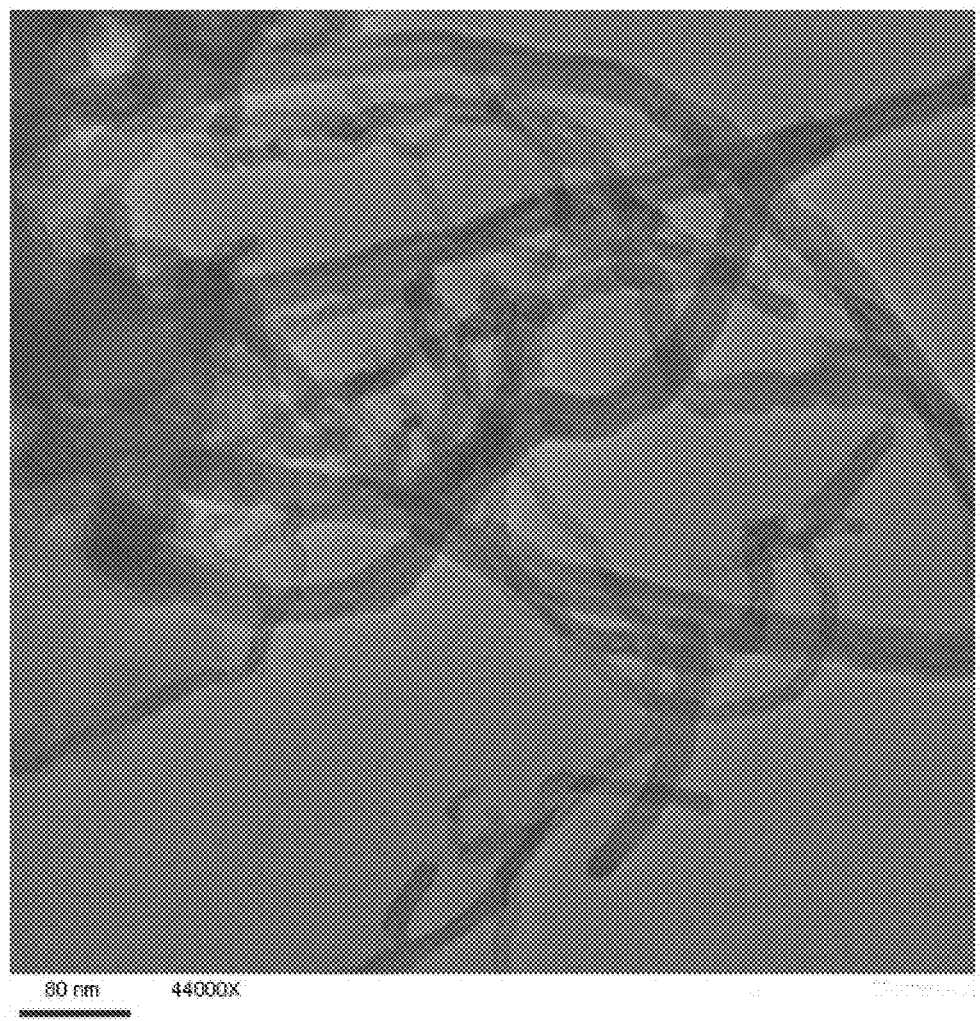
FIG. 4 is a transmission electron microscope (TEM) image of a nano-hybrid catalyst of carbon nanotubes and nickel ferrite (10 wt % Ni—Fe) calcinated at 260° C., at 80 nm.

With reference now to FIG. 4 of the DRAWINGS, there are shown the aforementioned nano-hybrid catalyst of carbon nanotubes and nickel ferrite as shown in FIG. 3 (albeit here at 10 wt % Ni—Fe) calcinated at 260° C., with image resolution at 80 nm.

TABLE 1

| Composition | 30 wt % CNT | 80 wt % CNT | 90 wt % CNT |
|---|---|---|---|
| Calcination Temperature (° C.) | 260 | 230 | 220 |

Example 3

As described in detail hereinabove, the $NO_x$ conversion through a selective catalytic reduction (SCR) process of the catalyst samples, as described in Examples 1 and 2, was conducted at different temperatures.

Figure 5:
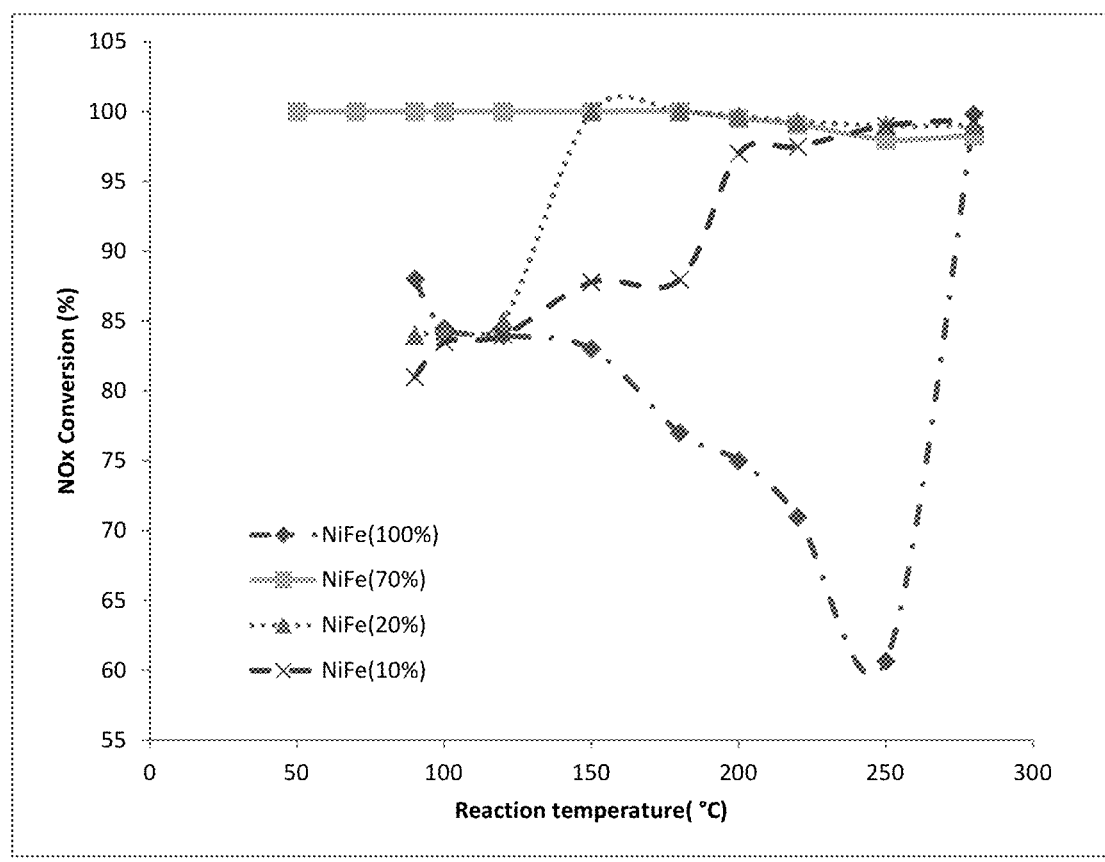
FIG. 5 is a chart or diagram of the conversion, for the selective catalytic reduction of $NO_x$ compounds, versus temperature pursuant to the teachings of the present invention. The diagram shows the nitrogen oxides reduction over the nanospherical nickel ferrite, which was synthesized at 28° C., as well as nano-hybrids of carbon nanotubes/nickel ferrite comprised of 10, 20, 70 and 100 wt % nickel ferrite.

With reference now to FIG. 5 of the DRAWINGS, the composition of the feed gas stream, as set forth in TABLE 2, and the results for $NO_x$ removal corresponding thereto are illustrated.

TABLE 2

| Feed | NO (ppm) | $NH_3$(ppm) | $O_2$(vol %) |
|---|---|---|---|
| Composition of feed gases in an He atmosphere as carrier gas | 900 | 900 | 5 |

It should be understood that the aforesaid catalyst of the present invention preferably has a composition of carbon nanotubes in weight ratio to the metal ferrite of about 0.1 to about 10, also about 1 to about 8, and about 2 to about 6. It should be understood that the particular ration is dependent upon the type of carbon employed, as described further hereinbelow, and the particular metallic ferrite employed. For example, if heavier metallic elements, such as in periods 5-7, the ratio may increase, thereby also increasing the range, such as about 0.1 to about 30.

It should also be understood that different carbon nanotubes may be employed. For example, single-, double- and multi-walled carbon nanotubes may be used to form the catalyst. Indeed, the greater increase in surface area may also drive the carbon nanotube/metal ferrite ratio, described hereinabove, higher since the metal ferrites would have more surface to bind to, enabling a greater load.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the breadth or scope of the applicant's concept. Furthermore, although the present invention has been described in connection with a number of exemplary embodiments and implementations, the present invention is not so limited but rather covers various modifications and equivalent arrangements, which fall within the purview of the appended claims.

What is claimed is:

1. An $NO_x$ removal catalyst comprising:
a plurality of carbon nanotubes; and
a metal ferrite material, said metal ferrite material comprising primarily nanoparticles thereof dispersed onto surfaces of said plurality of carbon nanotubes; and
a reducing agent, said reducing agent selected from the group consisting of propane, methane, propylene, hydrogen, urea, ammonia and combinations thereof,
wherein when an $NO_x$ gas is passed over said catalyst of said plurality of carbon nanotubes with metal ferrite nanoparticles thereon, $NO_x$ molecules within said $NO_x$ gas are reduced.

2. The $NO_x$ removal catalyst according to claim 1, wherein said carbon nanotubes are selected from the group consisting of single-walled carbon nanotubes, double-walled carbon nanotubes, multi-walled carbon nanotubes, and combinations thereof.

3. The $NO_x$ removal catalyst according to claim 1, wherein the metal in said metal ferrite material is a metal is selected from the transition metals of the Periodic Table of Elements.

4. The $NO_x$ removal catalyst according to claim 1, wherein the metal in said metal ferrite material is selected from the group consisting of nickel, zinc, cobalt, manganese and combinations thereof.

5. The $NO_x$ removal catalyst according to claim 1, wherein the metal in said metal ferrite material is nickel.

6. The $NO_x$ removal catalyst according to claim 1, wherein said metal ferrite material comprises a weight percentage of the catalyst ranging from 10% to 70%.

7. The $NO_x$ removal catalyst according to claim 1, wherein the weight ratio of said carbon nanotubes to metal ferrite is about 0.1 to about 30.

8. The $NO_x$ removal catalyst according to claim 7, wherein the weight ratio of said carbon nanotubes to metal ferrite is about 0.1 to about 10.

9. The $NO_x$ removal catalyst according to claim 1, wherein said passage of $NO_x$ gas over said catalyst is done at temperatures ranging from about 28° C. to about 260° C.

10. The $NO_x$ removal catalyst according to claim 9, wherein said passage of $NO_x$ gas over said catalyst is done at temperatures ranging from about 50° C. to about 250° C.

11. The $NO_x$ removal catalyst according to claim 1, wherein said passage of $NO_x$ gas over said catalyst is done at temperatures ranging from about 50° C. to about 80° C.

12. The $NO_x$ removal catalyst according to claim 1, wherein said passage of $NO_x$ gas over said catalyst is done at temperatures less than about 260° C.

13. The $NO_x$ removal catalyst according to claim 1, wherein the reduction of said $NO_x$ gas over said catalyst is greater than 99% efficient.

14. The $NO_x$ removal catalyst according to claim 1, wherein the reduction of said $NO_x$ gas over said catalyst is about 100% efficient.

\* \* \* \* \*